(12) United States Patent
Yati et al.

(10) Patent No.: US 11,880,193 B2
(45) Date of Patent: Jan. 23, 2024

(54) SYSTEM AND METHOD FOR RENDERING SEM IMAGES AND PREDICTING DEFECT IMAGING CONDITIONS OF SUBSTRATES USING 3D DESIGN

(71) Applicant: KLA Corporation, Milpitas, CA (US)

(72) Inventors: Arpit Yati, Lucknow (IN); Chandrashekaran Gurumurthy, Milpitas, CA (US)

(73) Assignee: KLA Corporation, Milpitas, CA (US)

( * ) Notice: Subject to any disclaimer, the term of this patent is extended or adjusted under 35 U.S.C. 154(b) by 0 days.

(21) Appl. No.: 16/564,981

(22) Filed: Sep. 9, 2019

(65) Prior Publication Data
US 2021/0026338 A1    Jan. 28, 2021

(51) Int. Cl.
*G06T 7/00* (2017.01)
*G05B 19/418* (2006.01)
*G05B 13/02* (2006.01)

(52) U.S. Cl.
CPC ..... *G05B 19/41875* (2013.01); *G05B 13/027* (2013.01); *G06T 7/0006* (2013.01);
(Continued)

(58) Field of Classification Search
CPC ............ G05B 19/41875; G05B 13/027; G05B 2219/32194; G05B 2219/32335;
(Continued)

(56) References Cited

U.S. PATENT DOCUMENTS 7,027,635 B1  4/2006  Wihl et al.
8,041,103 B2  10/2011  Kulkarni et al.
(Continued)

FOREIGN PATENT DOCUMENTS

CN    108257166 A    7/2018
WO    2018125220 A1   7/2018
WO    2018208791 A1   11/2018

OTHER PUBLICATIONS

Hagita et al. "Super-resolution for asymmetric resolution of FIB-SEM 3D imaging using AI with deep learning" published Apr. 12, 2018 (Year: 2018).*
(Continued)

*Primary Examiner* — Ming Y Hon
(74) *Attorney, Agent, or Firm* — Suiter Swantz pc llo

(57) ABSTRACT

A system for characterizing a specimen is disclosed. In one embodiment, the system includes a characterization sub-system configured to acquire one or more images a specimen, and a controller communicatively coupled to the characterization sub-system. The controller may be configured to: receive training images of one or more features of a specimen from the characterization sub-system; receive training three-dimensional (3D) design images corresponding to the one or more features of the specimen; generate a deep learning predictive model based on the training images and the training 3D design images; receive product 3D design images of one or more features of a specimen; generate simulated images of the one or more features of the specimen based on the product 3D design images with the deep learning predictive model; and determine one or more characteristics of the specimen based on the one or more simulated images.

20 Claims, 11 Drawing Sheets

(52) U.S. Cl.
CPC .. *G06T 7/0008* (2013.01); *G05B 2219/32194* (2013.01); *G05B 2219/32335* (2013.01); *G05B 2219/45031* (2013.01); *G06T 2207/10061* (2013.01); *G06T 2207/20081* (2013.01); *G06T 2207/30148* (2013.01)

(58) Field of Classification Search
CPC ........ G05B 2219/45031; G06T 7/0006; G06T 7/0008; G06T 2207/20081; G06T 2207/30148; G06T 2207/10061; G06T 2207/20084
See application file for complete search history.

(56) References Cited

U.S. PATENT DOCUMENTS

| | | | |
|---|---|---|---|
| 8,175,373 B2 | 5/2012 | Abbott et al. | |
| 8,818,072 B2 | 8/2014 | Ong et al. | |
| 9,915,625 B2 | 3/2018 | Gao et al. | |
| 9,965,901 B2 | 5/2018 | Zhang et al. | |
| 10,043,261 B2 | 8/2018 | Bhaskar et al. | |
| 10,192,302 B2 | 1/2019 | Brauer et al. | |
| 10,346,740 B2 | 7/2019 | Zhang et al. | |
| 2002/0107650 A1* | 8/2002 | Wack | G01N 21/9501 702/81 |
| 2004/0158409 A1* | 8/2004 | Teshima | H01J 37/28 702/22 |
| 2009/0091566 A1* | 4/2009 | Turney | G06T 7/33 345/419 |
| 2009/0116696 A1* | 5/2009 | McKernan | G06T 7/0004 382/108 |
| 2010/0188486 A1* | 7/2010 | Amanullah | G01N 21/9501 348/48 |
| 2012/0021266 A1* | 1/2012 | Marple | H01M 6/10 429/94 |
| 2014/0130613 A1* | 5/2014 | Adiga | G01N 1/04 73/863.01 |
| 2015/0352794 A1* | 12/2015 | Nguyen | B22F 10/20 700/98 |
| 2017/0109874 A1* | 4/2017 | Hallasch | B23K 26/32 |
| 2017/0148226 A1* | 5/2017 | Zhang | G06F 30/398 |
| 2017/0200265 A1* | 7/2017 | Bhaskar | G06T 7/001 |
| 2018/0107928 A1 | 4/2018 | Zhang et al. | |
| 2018/0253851 A1* | 9/2018 | Monteiro | G06T 7/521 |
| 2018/0330233 A1* | 11/2018 | Rui | G06N 3/0454 |
| 2018/0330511 A1 | 11/2018 | Ha et al. | |
| 2019/0026881 A1 | 1/2019 | Sato | |
| 2019/0096056 A1* | 3/2019 | Giering | G06K 9/6262 |
| 2019/0228522 A1* | 7/2019 | Shinoda | G06N 3/0454 |
| 2020/0160554 A1* | 5/2020 | Zimmerman | G06T 7/11 |

OTHER PUBLICATIONS

PCT International Search Report and Written Opinion for International Application No. PCT/US2020/043162 dated Nov. 9, 2020, 8 pages.

* cited by examiner

SYSTEM AND METHOD FOR RENDERING SEM IMAGES AND PREDICTING DEFECT IMAGING CONDITIONS OF SUBSTRATES USING 3D DESIGN

CROSS-REFERENCE TO RELATED APPLICATION

The present application claims priority to India Provisional Patent Application No. 201941030221, filed Jul. 26, 2019, entitled RENDERING SEM IMAGE AND PREDICTING DEFECT IMAGING CONDITION USING 3D DESIGN, naming Arpit Yati and Chandrashekaran Gurumurthy as inventors, which is incorporated herein by reference in the entirety.

TECHNICAL FIELD

The present invention generally relates to the fields of specimen characterization and metrology and, more particularly, to a system and method for simulating defects of specimens utilizing machine learning techniques.

BACKGROUND

Demand for electronic logic and memory devices with ever-smaller footprints and features present a wide range of manufacturing challenges beyond fabrication at a desired scale. In the context of semiconductor fabrication, predicting and removing defects from semiconductor devices is an important step in improving throughput and yield. One of the primary challenges in identifying defects is the inability to predict the location, type, and structure of defects accurately.

Traditional techniques used to predict the relative location, type, and structure of defects involve the use of simulations. For example, in situations where a process engineer knows an approximate location, type, and rough structure of a probable defect, Monte Carlo simulations may be used to simulate scanning electron microscopy (SEM) images of the defect. Similarly, optical simulations solving Maxwell's equations may be used to predict the imaging conditions required to predict and identify the defect signal. Simulated SEM images and identified imaging conditions may then be used to more effectively identify defects, and improve throughput and yield.

These traditional techniques utilizing Monte Carlo simulations suffer from several drawbacks. First, these traditional simulation techniques are computationally expensive and time consuming. In particular, performing Monte Carlo simulations to generate SEM images based on design images/data can be incredibly time consuming. Accordingly, these techniques may only be capable of predicting/identifying several defects a day, which greatly hinders throughput of a semiconductor fabrication process. Additionally, Monte Carlo-based simulation techniques are unable to render design images/data based on SEM images, and are unable to determine material properties of a specimen based on simulated SEM images.

Therefore, it would be desirable to provide a system and method that cure one or more of the shortfalls of the previous approaches identified above.

SUMMARY

A system for characterizing a specimen is disclosed. In one embodiment, the system includes a characterization sub-system configured to acquire one or more images a specimen. In another embodiment, the system includes a controller communicatively coupled to the characterization sub-system. The controller may be configured to: receive one or more training images of one or more features of a specimen from the characterization sub-system; receive one or more training three-dimensional (3D) design images corresponding to the one or more features of the specimen; generate a deep learning predictive model based on the one or more training images and the one or more training 3D design images; receive one or more product 3D design images of one or more features of a specimen; generate one or more simulated images of the one or more features of the specimen based on the one or more product 3D design images with the deep learning predictive model; and determine one or more characteristics of the specimen based on the one or more simulated images.

A system for characterizing a specimen is disclosed. In one embodiment, the system includes a controller configured to: receive one or more training images of one or more features of a specimen; receive one or more training three-dimensional (3D) design images corresponding to the one or more features of the specimen; generate a deep learning predictive model based at least on the one or more training images and the one or more training 3D design images; receive one or more product 3D design images of one or more features of a specimen; generate one or more simulated images of the one or more features of the specimen based on the one or more product 3D design images with the deep learning predictive model; and determine one or more characteristics of the specimen based on the one or more simulated images.

A system for characterizing a specimen is disclosed. In one embodiment, the system includes a characterization sub-system configured to acquire one or more images of a specimen, and a controller communicatively coupled to the characterization sub-system. The controller may be configured to: receive one or more training images of one or more features of a specimen from the characterization sub-system; receive one or more training three-dimensional (3D) design images corresponding to the one or more features of the specimen; generate a deep learning predictive model based on the one or more training images and the one or more training 3D design images; receive one or more product images of one or more features of a specimen; generate one or more simulated 3D design images of the one or more features of the specimen based on the one or more product images with the deep learning predictive model; and determine one or more characteristics of the specimen based on the one or more simulated 3D design images.

A system for characterizing a specimen is disclosed. In one embodiment, the system includes a controller configured to: receive one or more training images of one or more features of a specimen; receive one or more training 3D design images corresponding to the one or more features of the specimen; generate a deep learning predictive model based at least on the one or more training images and the one or more training 3D design images; receive one or more product images of one or more features of a specimen; generate one or more simulated 3D design images of the one or more features of the specimen based on the one or more product images with the deep learning predictive model; and determine one or more characteristics of the specimen based on the one or more simulated 3D design images.

A method for characterizing a specimen is disclosed. In one embodiment, the method includes: acquiring one or more training images of one or more features of a specimen with a characterization sub-system; receiving one or more training three-dimensional (3D) design images of the one or more features of the specimen; generating a deep learning predictive model based on the one or more training images and the one or more training 3D design images; receiving one or more product 3D design images of one or more features of a specimen; generating one or more simulated images of the one or more features of the specimen based on the one or more product 3D design images with the deep learning predictive model; and determining one or more characteristics of the specimen based on the one or more simulated images.

A method for characterizing a specimen is disclosed. In one embodiment, the method includes: acquiring one or more training images of one or more features of a specimen with a characterization sub-system; receiving one or more training three-dimensional (3D) design images of the one or more features of the specimen; generating a deep learning predictive model based on the one or more training images and the one or more training 3D design images; receiving one or more product images of the one or more features of a specimen; generating one or more simulated design images of the one or more features of the specimen based on the one or more product images with the deep learning predictive model; and determining one or more characteristics of the specimen based on the one or more simulated design images.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Reference will now be made in detail to the subject matter disclosed, which is illustrated in the accompanying drawings.

Embodiments of the present disclosure are directed to a system and method for generating simulated scanning electron microscopy (SEM) images and/or simulated optical images based on three-dimensional (3D) design images utilizing machine learning techniques (e.g., a deep learning predictive model). Additional embodiments of the present disclosure are directed to a system and method for generating simulated three-dimensional (3D) design images based on scanning electron microscopy (SEM) images utilizing machine learning techniques (e.g., a deep learning predictive model). Further embodiments of the present disclosure are directed to adaptively modifying 3D design images of a specimen utilizing simulated SEM images and/or simulated 3D design images generated with machine learning techniques.

It is contemplated herein that embodiments of the present disclosure may enable faster, more efficient identification of specimen defects throughout a fabrication process, thereby improving throughput and yield. Additionally, embodiments of the present disclosure may enable adaptive modification of 3D design data in order to improve fabrication of specimen throughout a fabrication process. It is further contemplated herein that the system and method of the present disclosure may enable the generation of 3D design images/files from SEM images, as well as the prediction of material properties utilizing generated simulated SEM images, which is not possible using traditional modeling techniques.

Figure 1:
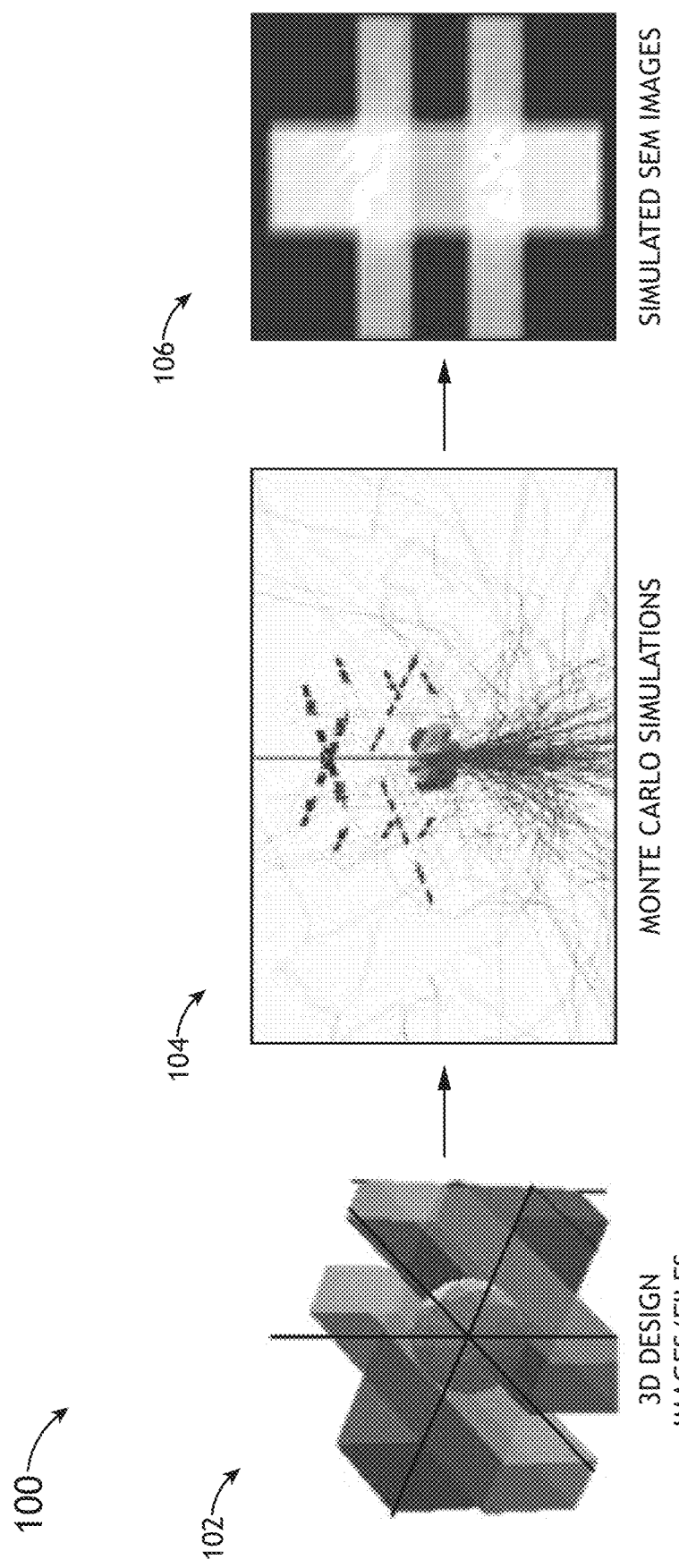
FIG. 1 illustrates a flowchart for generating simulated SEM images of a specimen using Monte Carlo simulations.

FIG. 1 illustrates a flowchart 100 for generating simulated SEM images of a specimen using Monte Carlo simulations. Flowchart 100 illustrated in FIG. 1 is provided as an example of a traditional simulation technique utilizing Monte Carlo simulations. It is contemplated herein that a brief description of flowchart 100 may provide a baseline against which attendant advantages of the present disclosure may be compared.

In order to predict the relative location, type, and structure of defects within a specimen (e.g., semiconductor wafer), traditional techniques input three-dimensional (3D) design images 102 (e.g., 3D design files 102) to one or more processors in order to run Monte Carlo simulations 104. The Monte Carlo simulations 104 may then generate one or more simulated scanning electron microscopy (SEM) images 106 intended to emulate the relative location, type, and structure of defects within the specimen.

These traditional techniques utilizing Monte Carlo simulations 104 suffer from several drawbacks. First, these traditional simulation techniques are computationally expensive and time consuming. In particular, performing Monte Carlo simulations 104 to generate simulated SEM images 106 based on 3D design images 102 can be incredibly time consuming. Accordingly, these techniques may only be capable of predicting/identifying several defects a day, which greatly hinders throughput of a semiconductor fabrication process. Moreover, Monte Carlo-based simulation techniques are unable to render 3D design images 102 based on acquired SEM images, and are unable to predict material properties of a specimen based on simulated SEM images 106.

Accordingly, embodiments of the present disclosure are directed to a system and method which cure one or more of the shortfalls of previous approaches identified above.

Figure 2:
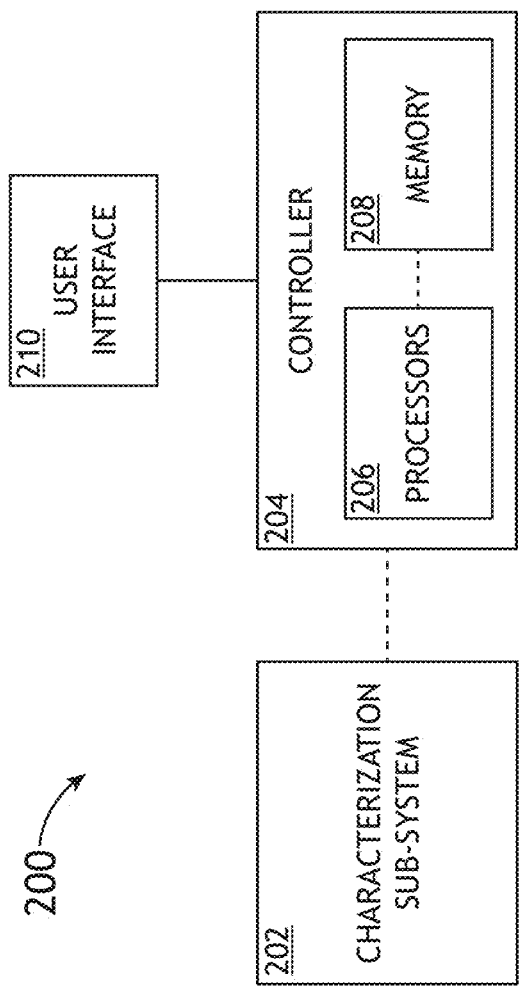
FIG. 2 illustrates a system for characterizing a specimen utilizing machine learning techniques to generate simulated images of the specimen, in accordance with one or more embodiments of the present disclosure.

FIG. 2 illustrates a system 200 for characterizing a specimen utilizing machine learning techniques to generate simulated images of the specimen, in accordance with one or more embodiments of the present disclosure. The system 200 may include, but is not limited to, one or more characterization sub-systems 202. The system 200 may additionally include, but is not limited to, a controller 204 including one or more processors 206 and a memory 208, and a user interface 210.

The characterization sub-system 202 may include any characterization sub-system 202 known in the art including, but not limited to, an optical-based characterization system, a charged particle-based characterization system, and the like. For example, the characterization sub-system 202 may include a scanning electron microscopy (SEM) characterization system. In one embodiment, the controller 204 is communicatively coupled to the one or more characterization sub-systems 202. In this regard, the one or more processors 206 of the controller 204 may be configured to generate one or more control signals configured to adjust one or more characteristics of the characterization sub-system 202.

Figure 3A:
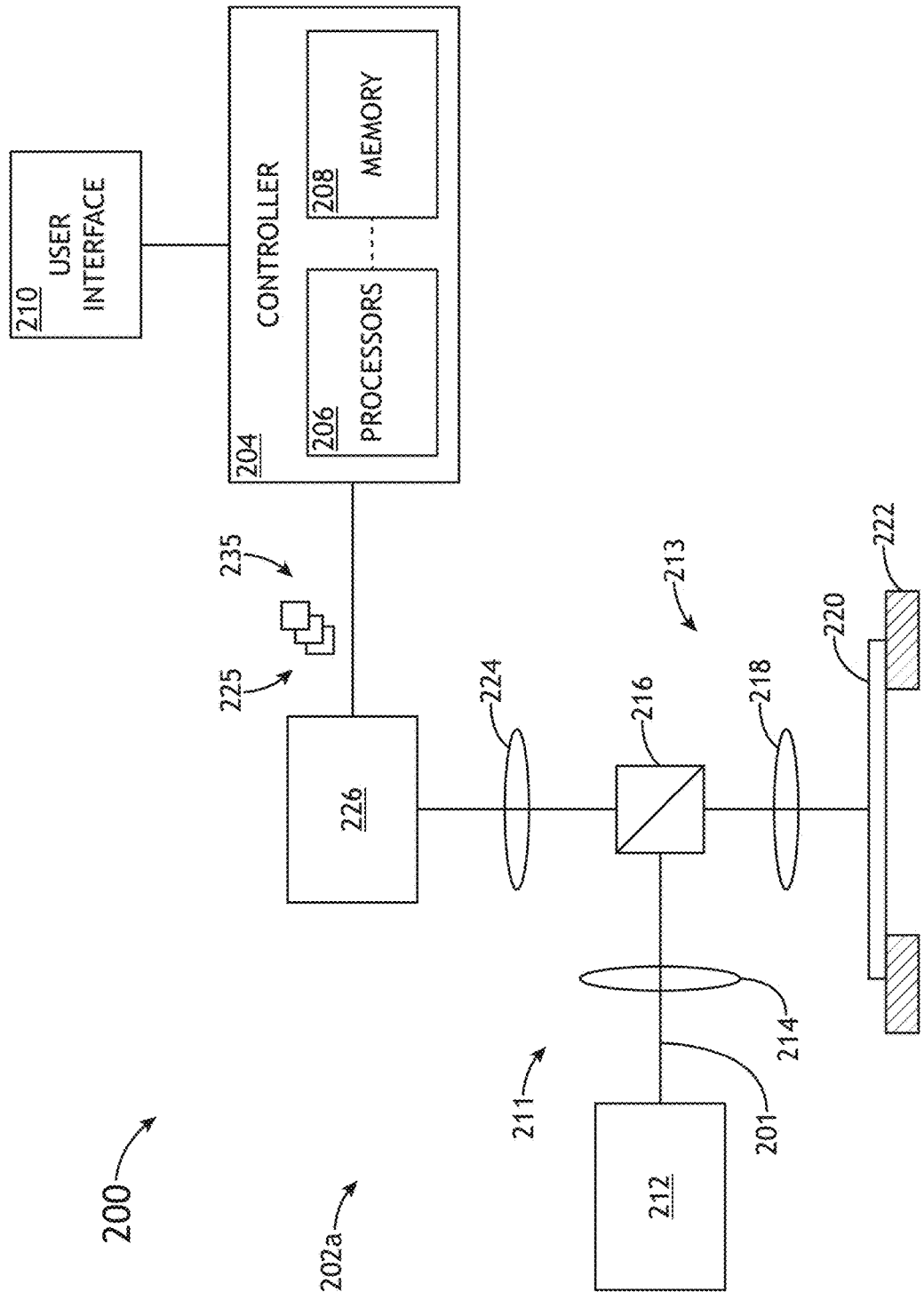
FIG. 3A illustrates a system for characterizing a specimen utilizing machine learning techniques to generate simulated images of the specimen, in accordance with one or more embodiments of the present disclosure.

FIG. 3A illustrates a system 200 for characterizing a specimen utilizing machine learning techniques to generate simulated images of the specimen, in accordance with one or more embodiments of the present disclosure. In particular, FIG. 6A illustrates a system 200 including an optical characterization sub-system 202a.

The optical characterization sub-system 202a may include any optical-based characterization system known in the art including, but not limited to, an image-based metrology tool. For example, the characterization sub-system 202a may include an optical critical dimension metrology tool. The optical characterization sub-system 202a may include, but is not limited to, an illumination source 212, an illumination arm 211, a collection arm 213, and a detector assembly 226.

In one embodiment, optical characterization sub-system 202a is configured to inspect and/or measure the specimen 220 disposed on the stage assembly 222. Illumination source 212 may include any illumination source known in the art for generating illumination 201 including, but not limited to, a broadband radiation source. In another embodiment, optical characterization sub-system 202a may include an illumination arm 211 configured to direct illumination 201 to the specimen 220. It is noted that illumination source 212 of optical characterization sub-system 202a may be configured in any orientation known in the art including, but not limited to, a dark-field orientation, a light-field orientation, and the like.

Specimen 220 may include any specimen known in the art including, but not limited to, a wafer, a reticle, a photomask, and the like. In one embodiment, specimen 220 is disposed on a stage assembly 222 to facilitate movement of specimen 220. In another embodiment, the stage assembly 222 is an actuatable stage. For example, the stage assembly 222 may include, but is not limited to, one or more translational stages suitable for selectably translating the specimen 220 along one or more linear directions (e.g., x-direction, y-direction and/or z-direction). By way of another example, the stage assembly 222 may include, but is not limited to, one or more rotational stages suitable for selectively rotating the specimen 220 along a rotational direction. By way of another example, the stage assembly 222 may include, but is not limited to, a rotational stage and a translational stage suitable for selectably translating the specimen 220 along a linear direction and/or rotating the specimen 220 along a rotational direction. It is noted herein that the system 200 may operate in any scanning mode known in the art.

The illumination arm 211 may include any number and type of optical components known in the art. In one embodiment, the illumination arm 211 includes one or more optical elements 214, a beam splitter 216, and an objective lens 218. In this regard, illumination arm 211 may be configured to focus illumination 201 from the illumination source 212 onto the surface of the specimen 220. The one or more optical elements 214 may include any optical elements known in the art including, but not limited to, one or mirrors, one or more lenses, one or more polarizers, one or more beam splitters, and the like.

In another embodiment, optical characterization sub-system 202a includes a collection arm 213 configured to collect illumination reflected or scattered from specimen 220. In another embodiment, collection arm 213 may direct and/or focus the reflected and scattered light to one or more sensors of a detector assembly 226 via one or more optical elements 224. The one or more optical elements 224 may include any optical elements known in the art including, but not limited to, one or mirrors, one or more lenses, one or more polarizers, one or more beam splitters, and the like. It is noted that detector assembly 226 may include any sensor and detector assembly known in the art for detecting illumination reflected or scattered from the specimen 220.

In another embodiment, the detector assembly 226 of the optical characterization sub-system 202 is configured to collect metrology data of the specimen 220 based on illumination reflected or scattered from the specimen 220. In another embodiment, the detector assembly 226 is configured to transmit collected/acquired images and/or metrology data to the controller 204.

As noted previously herein, the controller 204 of system 200 may include one or more processors 206 and memory 208. The memory 208 may include program instructions configured to cause the one or more processors 206 to carry out various steps of the present disclosure. In one embodiment, the program instructions are configured to cause the one or more processors 206 to adjust one or more characteristics of the optical characterization sub-system 202 in order to perform one or more measurements of the specimen 220.

In additional and/or alternative embodiments, the characterization sub-system 202 may include a charged particle-based characterization sub-system 202. For example, the characterization sub-system 202 may include an SEM characterization sub-system, as illustrated in FIG. 3B.

Figure 3B:
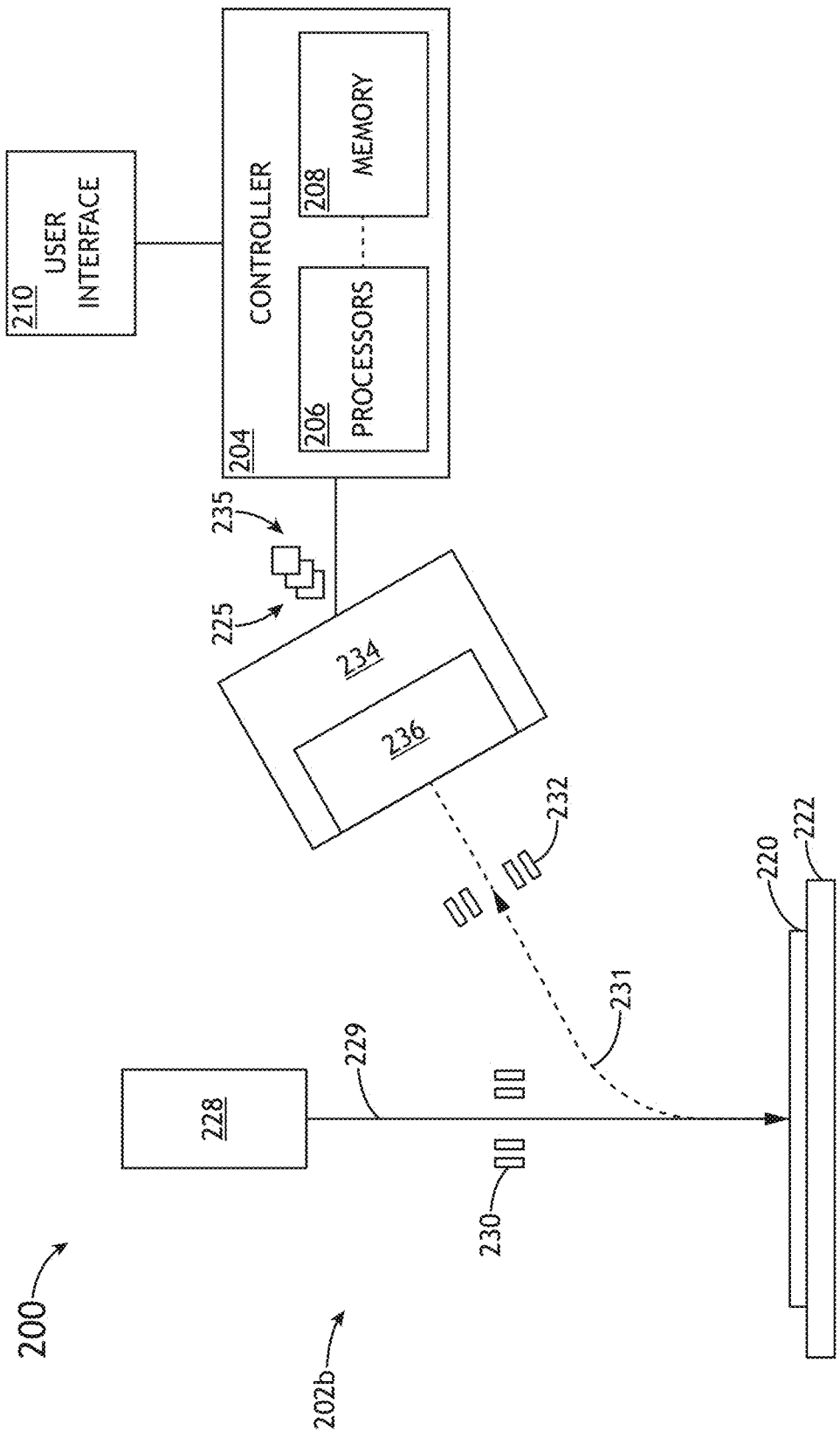
FIG. 3B illustrates a system for characterizing a specimen utilizing machine learning techniques to generate simulated images of the specimen, in accordance with one or more embodiments of the present disclosure.

FIG. 3B illustrates a system for characterizing a specimen utilizing machine learning techniques to generate simulated images of the specimen, in accordance with one or more embodiments of the present disclosure. In particular, FIG. 6B illustrates a system 200 including an SEM characterization sub-system 202b.

In one embodiment, the SEM characterization sub-system 202b is configured to perform one or more measurements on the specimen 220. In this regard, the SEM characterization sub-system 202b may be configured to acquire one or more images of the specimen 220. The SEM characterization sub-system 202b may include, but is not limited to, electron beam source 228, one or more electron-optical elements 230, one or more electron-optical elements 232, and an electron detector assembly 234 including one or more electron sensors 236.

In one embodiment, the electron beam source 228 is configured to direct one or more electron beams 229 to the specimen 220. The electron beam source 228 may form an electron-optical column. In another embodiment, electron beam source 228 includes one or more additional and/or alternative electron-optical elements 230 configured to focus and/or direct the one or more electron beams 229 to the surface of the specimen 220. In another embodiment, SEM characterization sub-system 202b includes one or more electron-optical elements 232 configured to collect secondary and/or backscattered electrons 231 emanated from the surface of the specimen 220 in response to the one or more electron beams 229. It is noted herein that the one or more electron-optical elements 230 and the one or more electron-optical elements 232 may include any electron-optical elements configured to direct, focus, and/or collect electrons including, but not limited to, one or more deflectors, one or more electron-optical lenses, one or more condenser lenses (e.g., magnetic condenser lenses), one or more objective lenses (e.g., magnetic condenser lenses), and the like.

It is noted that the electron optical assembly of the SEM characterization sub-system 202b is not limited to the electron-optical elements depicted in FIG. 3B, which are provided merely for illustrative purposes. It is further noted that the system 200 may include any number and type of electron-optical elements necessary to direct/focus the one or more electron beams 229 onto the specimen 220 and, in response, collect and image the emanated secondary and/or backscattered electrons 231 onto the electron detector assembly 234.

For example, the system 200 may include one or more electron beam scanning elements (not shown). For instance, the one or more electron beam scanning elements may include, but are not limited to, one or more electromagnetic scanning coils or electrostatic deflectors suitable for controlling a position of the one or more electron beams 229 relative to the surface of the specimen 220. Further, the one or more scanning elements may be utilized to scan the one or more electron beams 229 across the specimen 220 in a selected pattern.

In another embodiment, secondary and/or backscattered electrons 231 are directed to one or more sensors 236 of the electron detector assembly 234. The electron detector assembly 234 of the SEM characterization sub-system 202 may include any electron detector assembly known in the art suitable for detecting backscattered and/or secondary electrons 231 emanating from the surface of the specimen 220. In one embodiment, the electron detector assembly 234 includes an electron detector array. In this regard, the electron detector assembly 234 may include an array of electron-detecting portions. Further, each electron-detecting portion of the detector array of the electron detector assembly 234 may be positioned so as to detect an electron signal from specimen 220 associated with one of the incident one or more electron beams 229. In this regard, each channel of the electron detector assembly 234 may correspond to an electron beam 229 of the one or more electron beams 229. The electron detector assembly 234 may include any type of electron detector known in the art. For example, the electron detector assembly 234 may include a micro-channel plate (MCP), a PIN or p-n junction detector array, such as, but not limited to, a diode array or avalanche photo diodes (APDs). By way of another example, the electron detector assembly 234 may include a high-speed scintillator/PMT detector.

While FIG. 3B illustrates the SEM characterization sub-system 202b as including an electron detector assembly 234 comprising only a secondary electron detector assembly, this is not to be regarded as a limitation of the present disclosure. In this regard, it is noted that the electron detector assembly 234 may include, but is not limited to, a secondary electron detector, a backscattered electron detector, and/or a primary electron detector (e.g., an in-column electron detector). In another embodiment, SEM characterization sub-system 202 may include a plurality of electron detector assemblies 234. For example, system 200 may include a secondary electron detector assembly 234a, a backscattered electron detector assembly 234b, and an in-column electron detector assembly 234c.

In one embodiment, the one or more processors 206 of the controller 204 are configured to analyze the output of detector assembly 226/electron detector assembly 234. In one embodiment, the set of program instructions are configured to cause the one or more processors 206 to analyze one or more characteristics of specimen 220 based on images received from the detector assembly 226/electron detector assembly 234. In another embodiment, the set of program instructions are configured to cause the one or more processors 206 to modify one or more characteristics of system 200 in order to maintain focus on the specimen 220 and/or the detector assembly 226/electron detector assembly 234. For example, the one or more processors 206 may be configured to adjust one or more characteristics of the illumination source 212/electron beam source 228 and/or other elements of system 200 in order to focus of the illumination 201 and/or one or more electron beams 229 onto the surface of the specimen 220. By way of another example, the one or more processors 206 may be configured to adjust the one or more elements of system 200 in order to collect illumination and/or secondary electrons 231 from the surface of the specimen 220 and focus the collected illumination on the detector assembly 226/electron detector assembly 234. By way of another example, the one or more processors 206 may be configured to adjust one or more focusing voltages applied to one or more electrostatic deflectors of electron beam source 228 in order to independently adjust the position or alignment of the one or more electron beams 229 and scan the electron beams 229 across the specimen 220.

In one embodiment, the one or more processors 206 may be communicatively coupled to memory 208, wherein the one or more processors 206 are configured to execute a set of program instructions stored on memory 208, the set of program instructions configured to cause the one or more processors 206 to carry out various functions and steps of the present disclosure.

In another embodiment, as shown in FIG. 2 and in FIGS. 3A-3B, system 200 includes a user interface 210 communicatively coupled to the controller 204. In another embodiment, the user interface 210 includes a user input device and a display. The user input device of the user interface 210 may be configured to receive one or more input commands from a user, the one or more input commands configured to input data into system 200 and/or adjust one or more characteristics of system 200. In another embodiment, the display of the user interface 210 may be configured to display data of system 200 to a user.

As noted previously herein, the one or more processors 206 of the controller 204 may be communicatively coupled to memory 208, wherein the one or more processors 206 are configured to execute a set of program instructions stored on memory 208, the set of program instructions configured to cause the one or more processors 206 to carry out various functions and steps of the present disclosure. In this regard, the controller 204 may be configured to: receive one or more training images 225 of one or more features of a specimen 220 from the characterization sub-system 202; receive one or more training three-dimensional (3D) design images corresponding to the one or more features of the specimen 220; generate a deep learning predictive model based on the one or more training images 225 and the one or more training 3D design images; receive one or more 3D product design images of one or more features of a specimen 220; generate one or more simulated images of the one or more features of the specimen 220 based on the one or more 3D product design images with the deep learning predictive model; and determine one or more characteristics of the specimen 220 based on the one or more simulated images. Each of these steps/functions of the controller 204 will each be described in further detail herein.

Figure 4A:
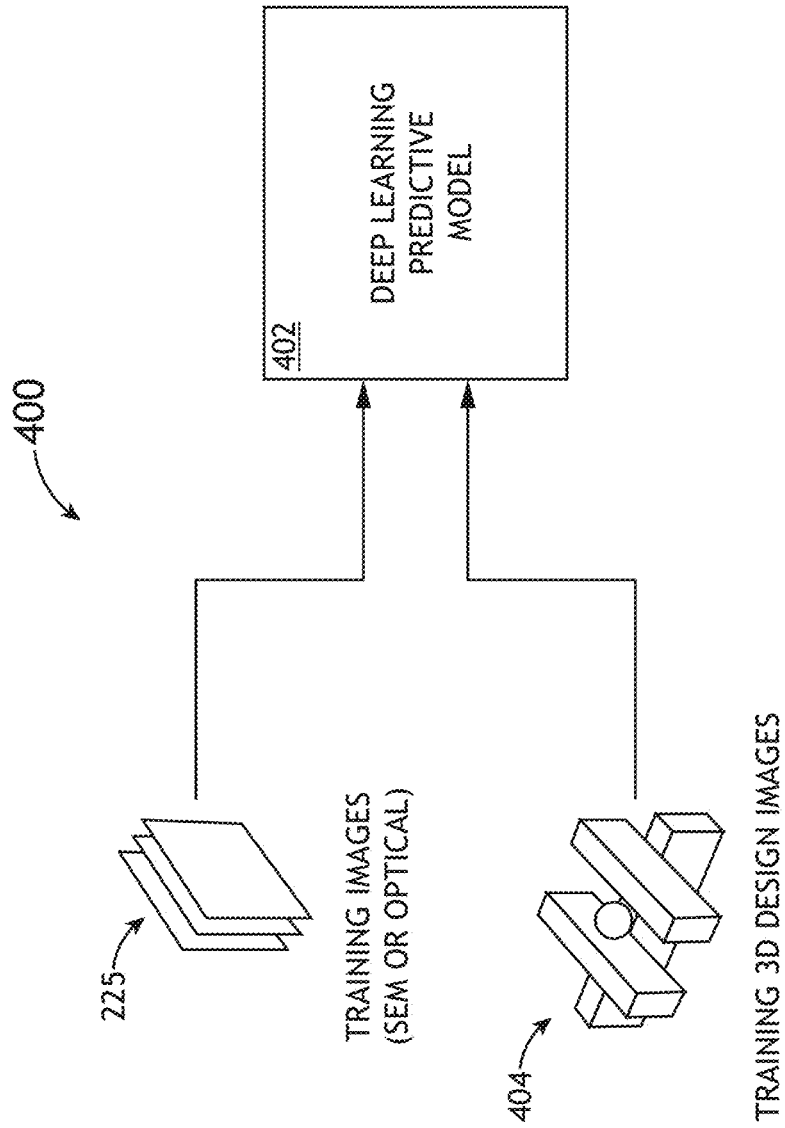
FIG. 4A illustrates a flowchart for training a deep learning predictive model, in accordance with one or more embodiments of the present disclosure.

FIG. 4A illustrates a flowchart 400 for training a deep learning predictive model, in accordance with one or more embodiments of the present disclosure. In this regard, flowchart 400 may be considered as a conceptual flowchart illustrating steps performed by/within the one or more processors 206 of the controller 204.

In one embodiment, the controller 204 is configured to receive one or more training images 225 of one or more features of a specimen 220 from the characterization sub-system 202. For the purposes of the present disclosure, the term "training images" may be regarded as images which will be used as inputs to train a machine learning classifier.

For example, as shown in FIG. 3A, the controller 204 may be configured to receive one or more optical training images 225 of one or more features of the specimen 220 from the optical characterization sub-system 202a. By way of another example, as shown in FIG. 3B, the controller 204 may be configured to receive one or more SEM training images 225 of the one or more features of the specimen 220 from the SEM characterization sub-system 202b. In this regard, the training images 225 depicted in FIG. 4A may include an optical training image 225, an SEM training image 225, and the like. In additional and/or alternative embodiments, the controller 204 may be configured to receive one or more training images 225 from a source other than the one or more characterization sub-systems 202. For example, the controller 204 may be configured to receive one or more training images 225 of features of a specimen 220 from an external storage device and/or memory 208. In another embodiment, controller 204 may be further configured to store received training images 225 in memory 208.

The one or more features of the specimen may include any features which may be of interest throughout a specimen 220 fabrication/characterization process including, but not limited to, patterned structures, defects, high aspect ratio (HAR) structures, critical dimension (CD) structures, and the like. The controller 204 may be configured to store the one or more training images 225 in memory 208.

In another embodiment, the controller 204 is configured to receive one or more training three-dimensional (3D) design images 404 corresponding to the one or more features of the specimen 220. The term "training 3D design image 404," and like terms, may be regarded as any data, file, or image associated with a design of a specimen 220. In this regard, the term "3D design image" may be used interchangeably with the terms "3D design data" and "3D design file." It is contemplated herein that training 3D design images 404 may include material information and/or specimen topography information, which may enable the generation of more sophisticated deep learning predictive model 402 configured to determine material and/or topography characteristics of a specimen 220 in subsequent steps. In some embodiments, the one or more training 3D design images 404 are stored in memory 208 such that the controller 204 is configured to receive and/or retrieve the one or more training 3D design images 404 from memory 208.

In another embodiment, the controller 204 is configured generate a deep learning predictive model 402 based on the one or more training images 225 and the one or more training 3D design images 404. In this regard, the one or more training images 225 and the one or more training 3D design images 404 may be used as inputs to train the deep learning predictive model 402. The deep learning predictive model 402 may include any type of machine learning algorithm/classifier and/or deep learning technique or classifier known in the art including, but not limited to, a conditional generative adversarial network (CGAN), a convolutional neural network (CNN) (e.g., GoogleNet, AlexNet, and the like), an ensemble learning classifier, a random forest classifier, artificial neural network (ANN), and the like. In embodiments, the controller 204 may be configured to store the generated deep learning predictive model 402 in memory 208.

Figure 4B:
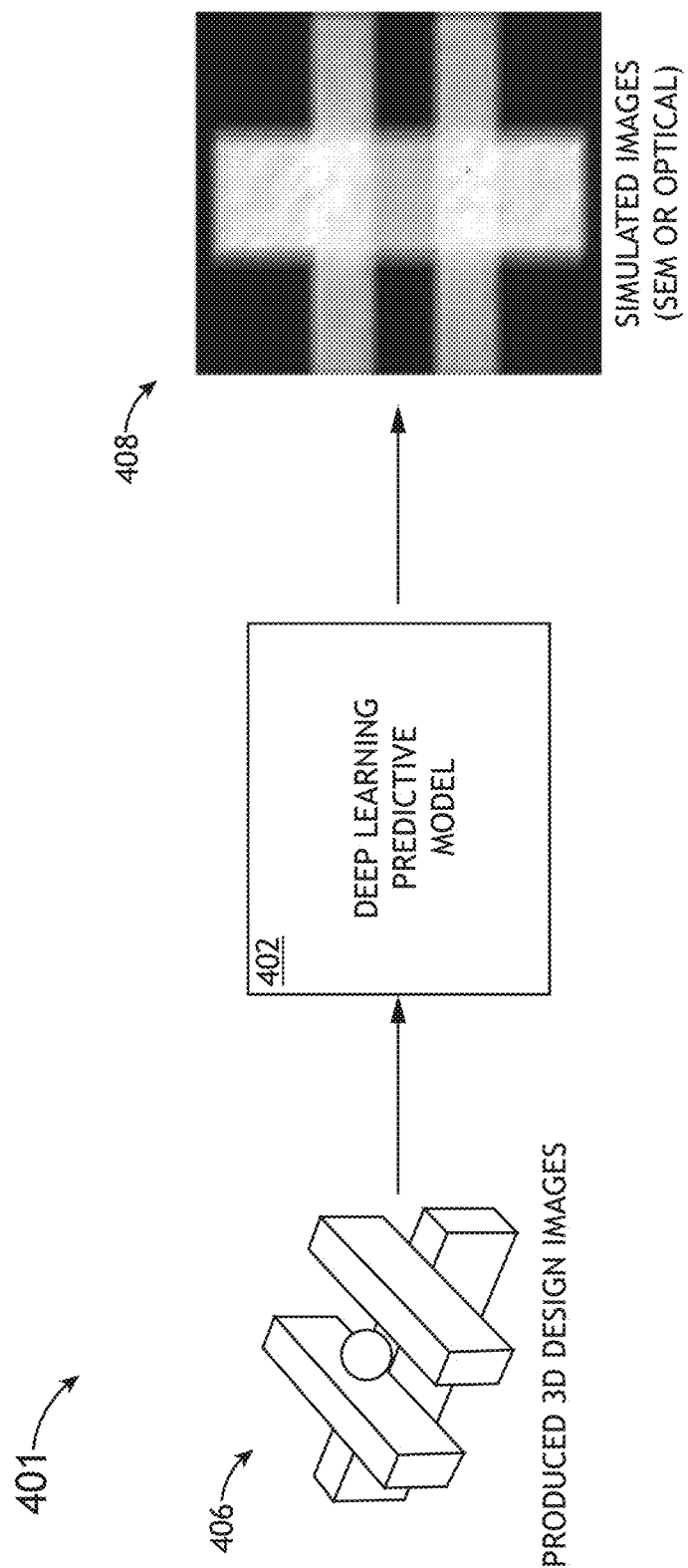
FIG. 4B illustrates a flowchart of a trained deep learning predictive model configured to generate simulated images of a specimen based on product three-dimensional design images of the specimen, in accordance with one or more embodiments of the present disclosure.
Figure 4C:
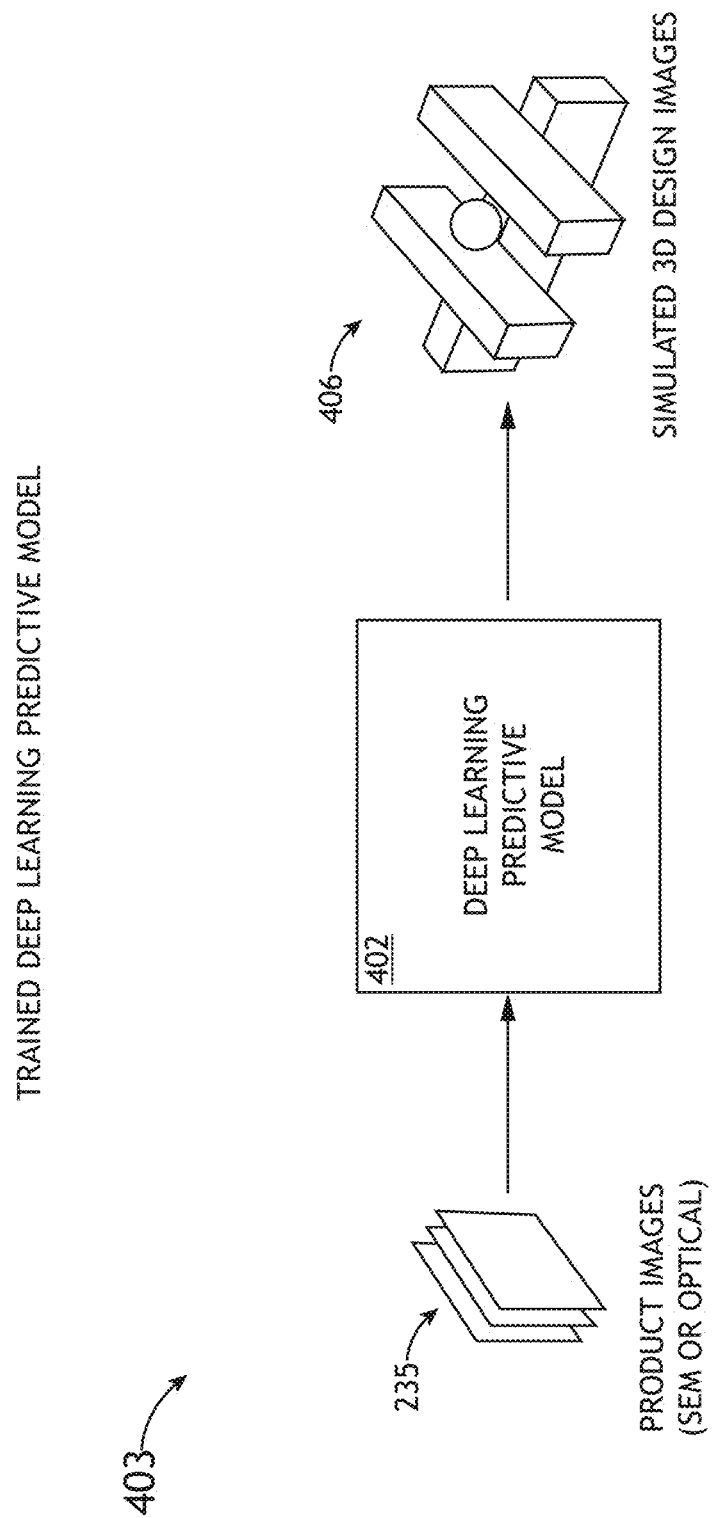
FIG. 4C illustrates a flowchart of a trained deep learning predictive model configured to generate simulated three-dimensional design images of a specimen based on product images of the specimen, in accordance with one or more embodiments of the present disclosure.

It is contemplated herein that the controller 204 may be configured to generate the deep learning predictive model 402 via supervised learning and/or unsupervised learning. Training/generating the deep learning predictive model 402 may include teaching the deep learning predictive model 402 to generate simulated images 408 based on product 3D design images 406, as shown in FIG. 4B. Conversely, training/generating the deep learning predictive model 402 may include teaching the deep learning predictive model 402 to generate simulated 3D design images 410 based on product images 235, as shown in FIG. 4C. In this regard, the deep learning predictive model 402 may include any algorithm, classifier, or predictive model configured to generate simulated images 408 and/or simulated 3D design images 410. This will be discussed in further detail herein.

FIG. 4B illustrates a flowchart 401 of a trained deep learning predictive model 402 configured to generate simulated images 408 of a specimen 220 based on product 3D design images 406 of the specimen 220, in accordance with one or more embodiments of the present disclosure.

In one embodiment, after the deep learning predictive model 402 has been trained, the controller 204 may be configured to receive one or more product 3D design images 406 of one or more features of a specimen 220. As it is used herein, the term "product" (e.g., "product" 3D design images 406, "product" images 435) may be used to refer to design images/data and/or images which are not used to train the deep learning predictive model 402. More specifically, product 3D design images 406 may refer to design data/images of a product specimen 220 of a fabrication/characterization process for which simulated images 408 are desired. For example, product 3D design images 406 may include design images of a prospective specimen 220 which is to be fabricated in a fabrication process. As noted previously, the one or more product 3D design images 406 may be stored in memory 208 such that the controller 204 is configured to receive and/or retrieve the one or more product 3D design images 410 from memory 208.

In embodiments, the one or more features of the specimen 220 may include any features which may be of interest throughout a specimen 220 fabrication/characterization process including, but not limited to, patterned structures, defects, high aspect ratio (HAR) structures, critical dimension (CD) structures, and the like. For example, when designing a specimen 220 which is to be fabricated, a process engineer may know the relative location, type, and rough structure of a defect which is likely to be created during the fabrication of the specimen 220. In order to predict what optical and/or SEM images of the probable defect may look like in order to more efficiently identify the defects after creation, the process engineer may generate product 3D design images 406 of the probable defect at various depths. These product 3D design images 406 may then be input to the deep learning predictive model 402.

In another embodiment, the controller 204 is configured to generate one or more simulated images 408 of the one or more features of the specimen 220 based on the one or more 3D product design images with the deep learning predictive model 402. For example, continuing with the same example above, one or more product 3D design images 406 of a probable defect (e.g., feature) within a future specimen 220 may be input to the deep learning predictive model 402. The controller 204 may be configured to receive these product 3D design images 406 of the probable defect, and generate one or more simulated images 408 of the probable defect (e.g., feature) with the deep learning predictive model 402. In this regard, a user may be able to visualize the intensity of various probable defects within simulated images 408. In embodiments, the deep learning predictive model 402 may be configured to generate simulated SEM images (e.g., simulated SEM images 408) of the probable defect and/or simulated optical images (e.g., simulated optical images 408) of the probable defect. The controller 204 may be configured to store the one or more simulated images 408 in memory 208.

In embodiments, the simulated images 408 (e.g., simulated SEM images 408, simulated optical images 408) generated by the deep learning predictive model 402 may be used as reference images for subsequent characterization, inspection, and detection. For example, by generating simulated images 408 of a defect, a user and/or the system 200 may be configured to recognize/identify probable characteristics of the defect (e.g., defect intensity, defect size, and the like). When a specimen 220 is subsequently inspected, the system 200 may be configured to more quickly and efficiently identify the defect based on the known probable characteristics of the defect identified within the simulated images 408. Moreover, by using the simulated images 408 as reference images, the controller 204 may be configured to identify defect imaging conditions of the characterization sub-system 202 which are optimized to characterize the defect in subsequent inspection. The controller 204 may generate one or more control signals configured to selectively adjust one or more characteristics of the characterization sub-system 202 in order to achieve identified defect imaging conditions.

In another embodiment, the controller 204 is configured to determine one or more characteristics of the specimen 220 based on the one or more simulated images 408. Continuing with the same example above, the controller 204 may be configured to determine one or more characteristics of the probable defect (e.g., feature) of the future specimen 220 based on the generated simulated SEM images 408 and/or generated simulated optical images 408. Characteristics of the specimen 220 and/or features of the specimen 220 which may be determined based on the simulated images 408 may include any characteristic of a specimen 220 known in the art including, but not limited to, a location of a defect within the specimen 220, a type of defect within the specimen 220, a material of the specimen 220, and a topography measurement of a surface and/or pattern of the specimen 220, and the like.

As noted previously, traditional modeling techniques based on Monte Carlo simulations may not be able to determine material characteristics of a specimen based on simulated images generated through the Monte Carlo simulations. In comparison, the machine learning techniques of the present disclosure may enable material characteristic determinations based on simulated images 408 and/or simulated 3D design images 410 generated by the deep learning predictive model 402.

In another embodiments, the controller 204 may be configured to adaptively modify one or more characteristics of the one or more product 3D design images 406 of the specimen 220 to generate one or more modified product 3D design images. For example, in the case where the one or more product 3D design images 406 include design data of probable defects within a specimen 220 which is to be fabricated, the controller 204 may utilize information collected from the simulated images 408 to adaptively modify the product 3D design images 406 in order to generate one or more modified product 3D design images. By modifying 3D design images/data of a specimen 220 prior to fabrication, various features and characteristics of the specimen 220 may be modified during fabrication. For instance, modifying 3D design images/data of a specimen 220 prior to fabrication may allow system 200 to decrease the number of defects within the specimen 220, decrease the size of defects within the specimen 220, modify the characteristics of the defects within the specimen 220 such that they are easier to identify, and the like.

In some embodiments, the controller 204 may be further configured to generate control signals configured to cause fabrication tools to fabricate a specimen 220 based on the modified product 3D design images. For example, referring to FIGS. 3A-3B, the system 200 may further include one or more fabrication tools communicatively coupled to the controller 204. The one or more fabrication tools may include any fabrication tool known in the art configured to fabricate a specimen 220 including, but not limited to, a lithography tool, an etching tool, a deposition tool, a polishing tool, and the like. Continuing with the same example, the controller 204 may be configured to generate one or more control signals configured to cause fabrication tools to fabricate a specimen 220 based on the modified product 3D design images stored in memory 208.

It is noted herein that the generation of simulated SEM images 408 may enable improved SEM-to-design alignment. In particular, by generating simulated SEM images 408 based on product 3D design images 406, the controller 204 may be configured to more efficiently orient and align the simulated SEM images 408 with the product 3D design images 406 than would otherwise be possible with non-simulated SEM images. In this regard, embodiments of the present disclosure may enable characteristics of features of the specimen 220 which are identified in the simulated SEM images 408 to be mapped to respective locations within the product 3D design images. Furthermore, embodiments of the present disclosure may enable more accurate critical dimension (CD) overlay.

In additional and/or alternative embodiments, the controller 204 may be configured to perform Monte Carlo simulations in order to evaluate an accuracy of the deep learning predictive model 402, and/or to verify resulting simulated SEM image 408 for which non-simulated SEM images are unavailable. For example, as shown in FIG. 4B, the controller 204 may be configured to generate one or more simulated SEM images 408 from one or more produce 3D design images 406 via the deep learning predictive model 402. Subsequently, the controller 204 may be configured to perform one or more Monte Carlo simulations on the one or more product 3D design images corresponding to the one or more features of the specimen 220 to generate one or more comparative images (e.g., comparative SEM images). The controller 204 may then be configured to determine an accuracy metric of the deep leaning predictive model 402 by comparing the one or more simulated SEM images 408 generated by the deep learning predictive model 402 and the one or more comparative SEM images generated by the Monte Carlo simulations.

In addition to generating simulated images 408 based on product 3D design images 406, as shown in FIG. 4B, the deep learning predictive model 402 may also be trained to generate simulated 3D design images 410 based on product images 235. This may be further understood with reference to FIG. 4C.

FIG. 4C illustrates a flowchart 403 of a trained deep learning predictive model 402 configured to generate simulated 3D design images 410 based on product images 235 of a specimen 220, in accordance with one or more embodiments of the present disclosure.

In one embodiment, the controller 204 is configured to receive one or more product images 235 of one or more features of a specimen 220 from the characterization sub-system 202. For example, as shown in FIG. 3A, the controller 204 may be configured to receive one or more optical product images 235 of one or more features of the specimen 220 from the optical characterization sub-system 202a. By way of another example, as shown in FIG. 3B, the controller 204 may be configured to receive one or more SEM product images 235 of the one or more features of the specimen 220 from the SEM characterization sub-system 202b. In this regard, the product images 235 depicted in FIG. 4C may include an optical product image 225, an SEM product image 225, and the like. In additional and/or alternative embodiments, the controller 204 may be configured to receive one or more product images 235 from a source other than the one or more characterization sub-systems 202. For example, the controller 204 may be configured to receive one or more product images 235 of features of a specimen 220 from an external storage device. In another embodiment, controller 204 may be further configured to store received training images 225 in memory 208.

In another embodiment, the controller 204 is configured to generate one or more simulated 3D design images 410 of the one or more features of the specimen 220 based on the one or more product images 235 with the deep learning predictive model 402. For example, one or more product images 235 may include images of a defect within a specimen 220. The controller 204 may be configured to receive these product images 235 of the defect, and generate one or more simulated 3D design images 410 of the defect (e.g., feature) with the deep learning predictive model 402. In this regard, design data/images may be created for product images 235 for which there is no associated design data. As noted previously herein, traditional modeling techniques based on Monte Carlo simulations are not able to re-create design data/images based on optical and/or SEM images. In this regard, the system 200 of the present disclosure may enable re-creation of 3D design data from images, which is not feasible with currently available techniques.

As noted previously herein with respect to the simulated images 408 in FIG. 4B, controller 204 may be further configured to determine one or more characteristics of the specimen 220 based on the simulated 3D design images 410. Additionally, the simulated 3D design images 410 may also be used to adaptively modify one or more characteristics of the system 200. Further, the controller 204 may be configured to generate one or more control signals configured to cause one or more fabrication tools to fabricate a specimen 220 based on the generated simulated 3D design images 410.

As noted previously herein, the deep learning predictive model 402 may include any type of machine learning algorithm/classifier and/or deep learning technique or classifier known in the art including, but not limited to, a conditional generative adversarial network (CGAN), a convolutional neural network (CNN) (e.g., GoogleNet, AlexNet, and the like), an ensemble learning classifier, a random forest classifier, artificial neural network (ANN), and the like. A deep learning predictive model 402 including a CGAN may be further understood with reference to FIG. 5.

Figure 5:
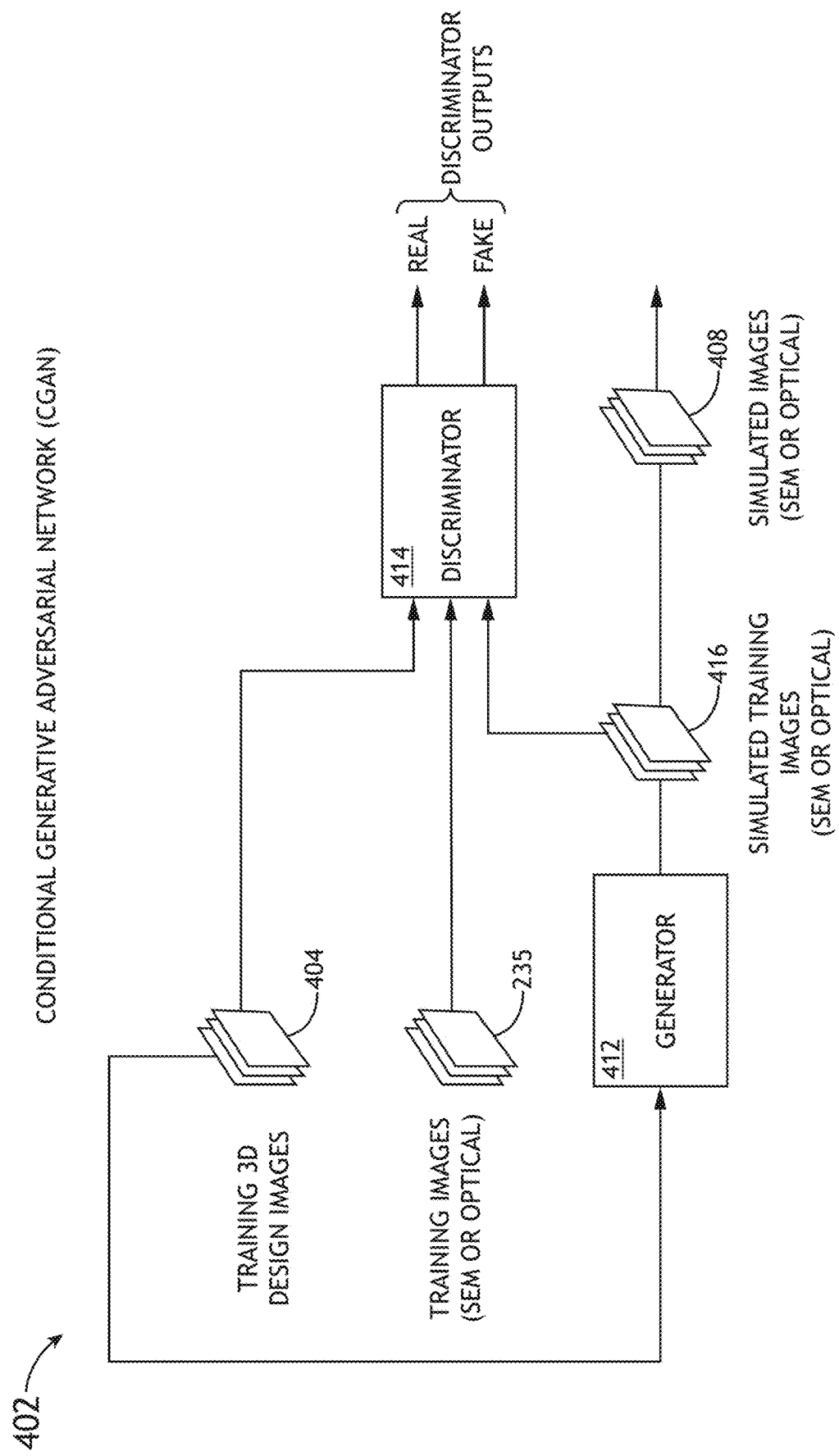
FIG. 5 illustrates a flowchart for training a deep learning predictive model including a conditional generative adversarial network (CGAN), in accordance with one or more embodiments of the present disclosure.

FIG. 5 illustrates a flowchart for training a deep learning predictive model 402 including a conditional generative adversarial network (CGAN), in accordance with one or more embodiments of the present disclosure.

In embodiments, a CGAN (e.g., deep learning predictive model 402) may include, but is not limited to, a generator 412 and a discriminator 414. In embodiments, the generator 412 may be configured to generate simulated training images 416 (e.g., "fake" images). Conversely, the discriminator 414 may be configured to receive a training 3D design image 404 and either a training image 235 (e.g., "real" image of a specimen 220) or a simulated training image 416 (e.g., "fake" image) and determine whether the image associated with the training 3D design image 404 is real or fake. Determinations of "real" or "fake" may be referred to as "discriminator outputs." In this regard, training the CGAN (e.g., deep learning predictive model 402) may involve training the discriminator 414 to become more accurate in identifying fake images, as well as training the generator 412 to generate more realistic "fake" images to "trick" the discriminator 414. As the discriminator 414 becomes better at deciphering between real images (e.g., training images 235) and fake images (e.g., simulated training images 416), the generator 412 must become better at generating more realistic simulated training images 416. After the generator 412 has been sufficiently trained, the simulated training images 416 may be output from the deep learning predictive model 402 as the simulated images 408 illustrated in FIG. 4B.

Accordingly, in some embodiments, the generator 412 of the CGAN may be configured to generate one or more simulated images 408 based on one or more training 3D design images 404 of one or more features of a specimen 220. Subsequently, the controller 204 may be configured to train the discriminator 414 of the CGAN based on the one or more training 3D design images 404, the one or more training images 235, and the one or more simulated training images 408. Training the discriminator 414 may include training the discriminator 414 to generate more accurate discriminator outputs (e.g., "real," "fake").

As the discriminator 414 becomes more efficient in identifying "fake" simulated training images 416, the generator 412 may also become more efficient in generating more realistic simulated training images 416. In this regard, it may be said that the generator 412 is "trained" based on the discriminator outputs. Accordingly, in some embodiments, by training the discriminator 414 to generate more accurate discriminator outputs, the controller 204 may be further configured to train the generator 412 of the CGAN based on one or more discriminator outputs of the discriminator 414. Upon training the generator 412, the generator 412 may be configured to generate the one or more simulated images 408 of the one or more features of the specimen 220 based on the one or more product 3D design images 406, as shown in FIG. 4B.

Figure 6:
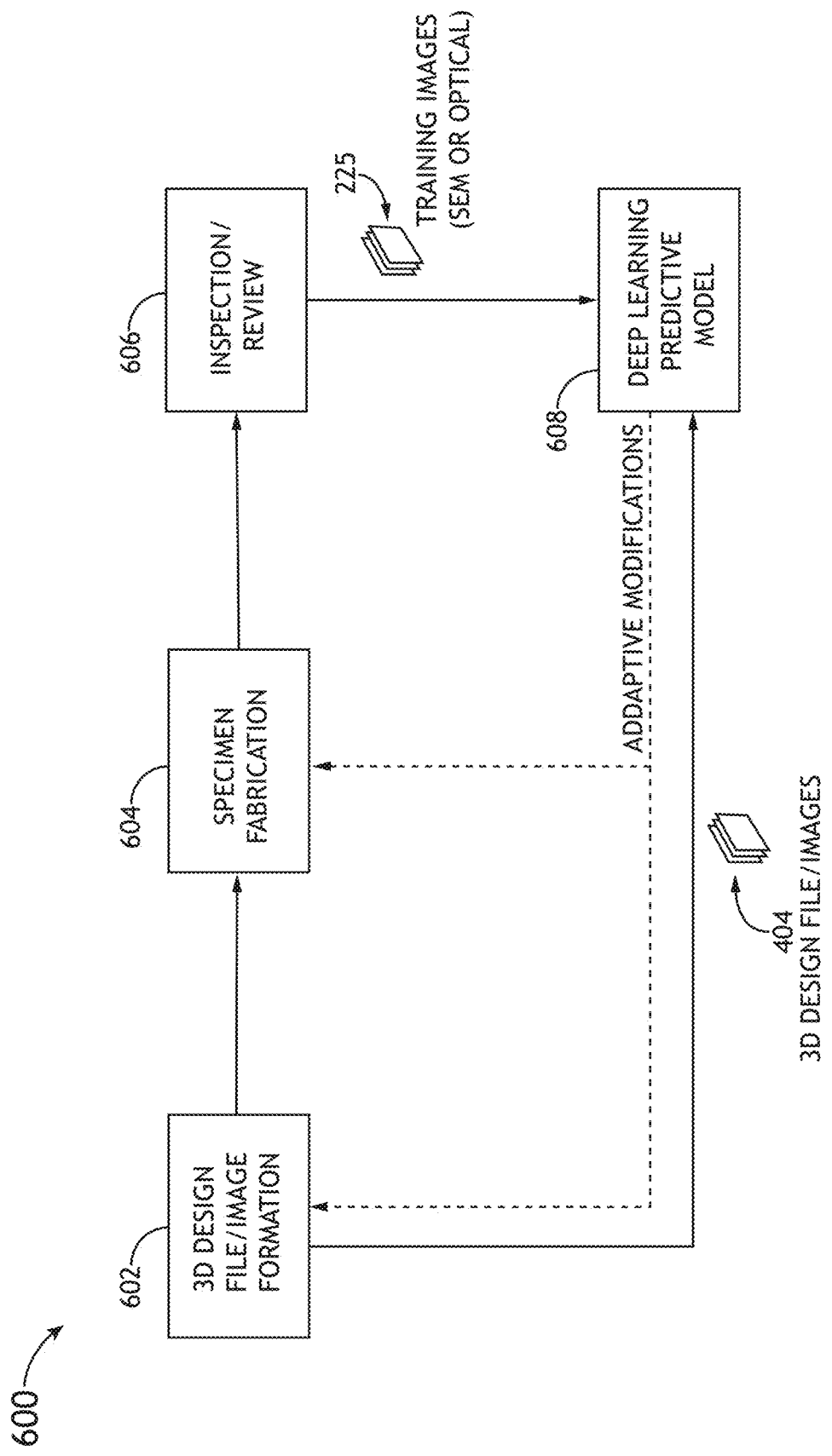
FIG. 6 illustrates a flowchart for adaptively modifying three-dimensional design images used to fabricate a specimen with a fabrication process utilizing a deep learning predictive model, in accordance with one or more embodiments of the present disclosure.

FIG. 6 illustrates a flowchart 600 for adaptively modifying 3D design images/files used to fabricate a specimen with a fabrication process utilizing a deep learning predictive model within a specimen fabrication process, in accordance with one or more embodiments of the present disclosure.

In a step 602, 3D design images/files are formed. For example, 3D design images may be formed by a controller 204 with or without input from a user. These 3D design images may be stored in memory 208.

In a step 604, one or more specimens are fabricated. The one or more specimens may be fabricated based on the 3D design images/files generated in step 602. It is noted herein that fabrication of one or more specimens may be carried out by any fabrication process or fabrication tools known in the art including, but not limited to, a lithography tool, an etching tool, a deposition tool, a polishing tool, and the like.

In a step 606, the one or more fabricated specimens are inspected/reviewed. The one or more specimens may be inspected/reviewed via any characterization tool known in the art including, but not limited to, an optical characterization tool (e.g., optical characterization sub-system 202a), an SEM characterization tool (e.g., SEM characterization sub-system 202b), and the like.

In a step 602, a deep learning predictive model is trained. For example, the controller 204 may be configured to receive the 3D design images (e.g., training 3D design images 404) and one or more training images 235 from the inspection/review process to train a deep learning predictive model 402.

After training the deep learning predictive model 402, the controller 204 may be configured to adaptively modify the 3D design images and/or the fabrication process. For example, upon training the deep learning predictive model 402, the deep learning predictive model 402 may be configured to determine one or more characteristics of the specimen 220 based on the simulated 3D design images 410. the controller 204 may be configured to adaptively modify one or more characteristics of the one or more product 3D design images 406 of the specimen 220 to generate one or more modified product 3D design images. For example, in the case where the one or more product 3D design images 406 include design data of probable defects within a specimen 220 which is to be fabricated, the controller 204 may utilize information collected from the simulated images 208 to adaptively modify the product 3D design images 406 in order to generate one or more modified product 3D design images. By modifying 3D design images/data of a specimen 220 prior to fabrication, various features and characteristics of the specimen 220 may be modified during fabrication. For instance, modifying 3D design images/data of a specimen 220 prior to fabrication may allow system 200 to decrease the number of defects within the specimen 220, decrease the size of defects within the specimen 220, modify the characteristics of the defects within the specimen 220 such that they are easier to identify, and the like.

Additionally, the simulated 3D design images 410 may also be used to adaptively modify one or more characteristics of the system 200. For example, after training the deep learning predictive model 402, the controller 204 may be further configured to generate control signals configured to cause fabrication tools to fabricate a specimen 220 based on modified product 3D design images and/or simulated 3D design images 410.

It is noted herein that the one or more components of system 200 may be communicatively coupled to the various other components of system 200 in any manner known in the art. For example, the one or more processors 206 may be communicatively coupled to each other and other components via a wireline (e.g., copper wire, fiber optic cable, and the like) or wireless connection (e.g., RF coupling, IR coupling, WiMax, Bluetooth, 3G, 4G, 4G LTE, 5G, and the like). By way of another example, the controller 204 may be communicatively coupled to one or more components of characterization sub-system 202 via any wireline or wireless connection known in the art.

In one embodiment, the one or more processors 206 may include any one or more processing elements known in the art. In this sense, the one or more processors 206 may include any microprocessor-type device configured to execute software algorithms and/or instructions. In one embodiment, the one or more processors 206 may consist of a desktop computer, mainframe computer system, workstation, image computer, parallel processor, or other computer system (e.g., networked computer) configured to execute a program configured to operate the system 200, as described throughout the present disclosure. It should be recognized that the steps described throughout the present disclosure may be carried out by a single computer system or, alternatively, multiple computer systems. Furthermore, it should be recognized that the steps described throughout the present disclosure may be carried out on any one or more of the one or more processors 206. In general, the term "processor" may be broadly defined to encompass any device having one or more processing elements, which execute program instructions from memory 208. Moreover, different subsystems of the system 200 (e.g., illumination source 212, electron beam source 228, detector assembly 226, electron detector assembly 234, controller 204, user interface 210, and the like) may include processor or logic elements suitable for carrying out at least a portion of the steps described throughout the present disclosure. Therefore, the above description should not be interpreted as a limitation on the present disclosure but merely an illustration.

The memory 208 may include any storage medium known in the art suitable for storing program instructions executable by the associated one or more processors 206 and the data received from the characterization sub-system 202. For example, the memory 208 may include a non-transitory memory medium. For instance, the memory 208 may include, but is not limited to, a read-only memory (ROM), a random-access memory (RAM), a magnetic or optical memory device (e.g., disk), a magnetic tape, a solid-state drive and the like. It is further noted that memory 208 may be housed in a common controller housing with the one or more processors 206. In an alternative embodiment, the memory 208 may be located remotely with respect to the physical location of the processors 206, controller 204, and the like. In another embodiment, the memory 208 maintains program instructions for causing the one or more processors 206 to carry out the various steps described through the present disclosure.

In one embodiment, a user interface 210 is communicatively coupled to the controller 204. In one embodiment, the user interface 210 may include, but is not limited to, one or more desktops, tablets, smartphones, smart watches, or the like. In another embodiment, the user interface 210 includes a display used to display data of the system 200 to a user. The display of the user interface 210 may include any display known in the art. For example, the display may include, but is not limited to, a liquid crystal display (LCD), an organic light-emitting diode (OLED) based display, or a CRT display. Those skilled in the art should recognize that any display device capable of integration with a user interface 210 is suitable for implementation in the present disclosure. In another embodiment, a user may input selections and/or instructions responsive to data displayed to the user via a user input device of the user interface 210.

Figure 7:
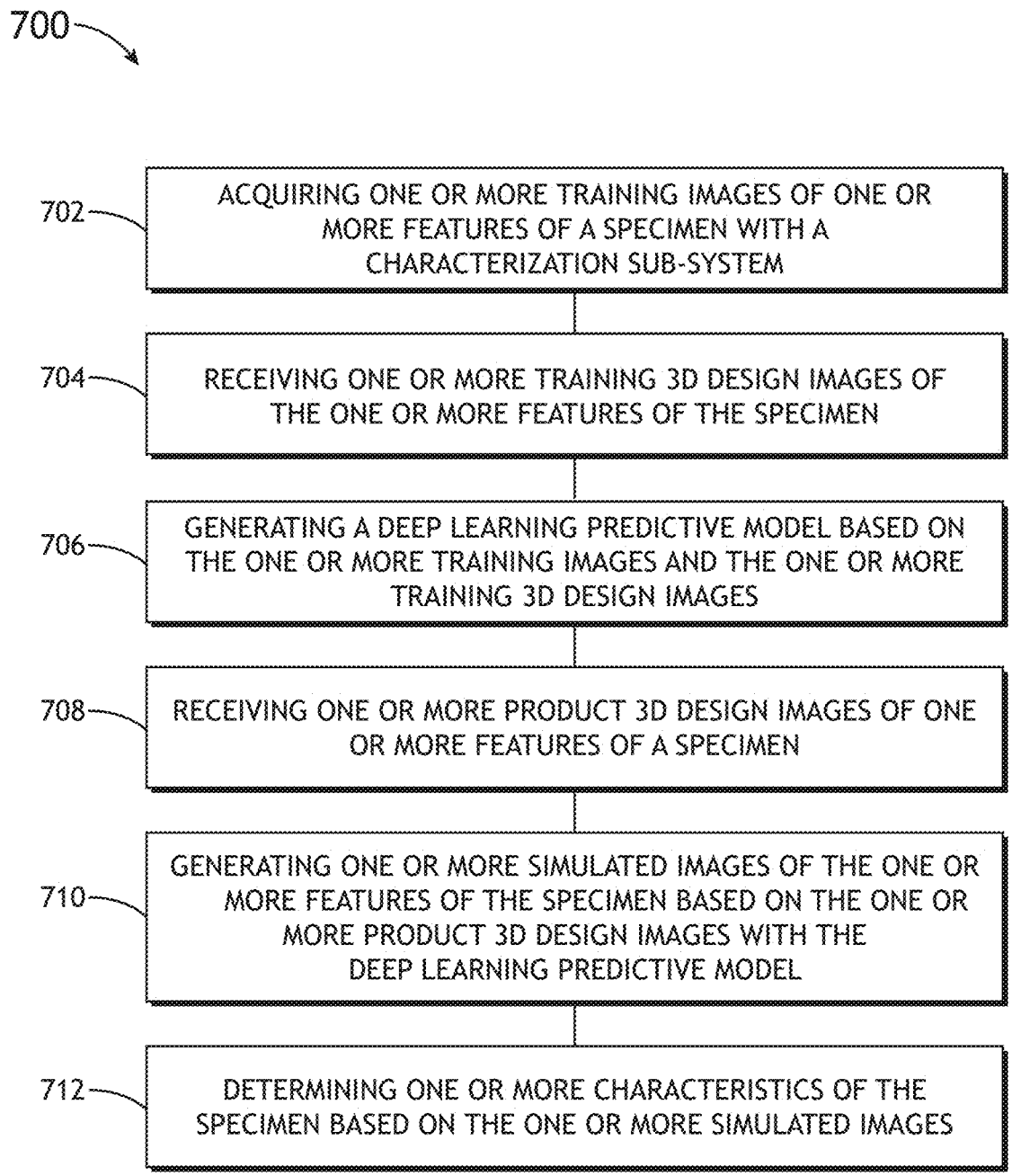
FIG. 7 illustrates a flowchart of a method for generating simulated images based on three-dimensional design images utilizing a deep learning predictive model, in accordance with one or more embodiments of the present disclosure.

FIG. 7 illustrates a flowchart of a method 700 for generating simulated images 408 based on three-dimensional design images 406 utilizing a deep learning predictive model 402, in accordance with one or more embodiments of the present disclosure. It is noted herein that the steps of method 700 may be implemented all or in part by system 200. It is further recognized, however, that the method 700 is not limited to the system 200 in that additional or alternative system-level embodiments may carry out all or part of the steps of method 700.

In a step 702, one or more training images of one or more features of a specimen are acquired with a characterization sub-system. For example, as shown in FIG. 3A, the controller 204 may be configured to receive one or more optical training images 225 of one or more features of the specimen 220 from the optical characterization sub-system 202a. By way of another example, as shown in FIG. 3B, the controller 204 may be configured to receive one or more SEM training images 225 of the one or more features of the specimen 220 from the SEM characterization sub-system 202b.

In a step 704, one or more training three-dimensional (3D) design images of the one or more features of the specimen are received. For example, the one or more training 3D design images 404 may be stored in memory 208 such that the controller 204 is configured to receive and/or retrieve the one or more training 3D design images 404 from memory 208.

In a step 706, a deep learning predictive model is generated based on the one or more training images and the one or more training 3D design images. For example, the one or more training images 225 and the one or more training 3D design images 404 may be used as inputs to train the deep learning predictive model 402. The deep learning predictive model 402 may include any type of machine learning algorithm/classifier and/or deep learning technique or classifier known in the art including, but not limited to, a conditional generative adversarial network (CGAN), a convolutional neural network (CNN) (e.g., GoogleNet, AlexNet, and the like), an ensemble learning classifier, a random forest classifier, artificial neural network (ANN), and the like.

In a step 708, one or more product 3D images of one or more features of a specimen are received. For example, as shown in FIG. 3A, the controller 204 may be configured to receive one or more product 3D design images 406 of one or more features of the specimen 220.

In a step 710, one or more simulated 3D design images of the one or more features of the specimen are generated based on the one or more product 3D design images with the deep learning predictive model. For example, the controller 204 may be configured to receive the one or more product 3D design images 406 of a probable defect, and generate one or more simulated images 408 of the probable defect (e.g., feature) with the deep learning predictive model 402.

[moo] In a step 712, one or more characteristics of the specimen are determined based on the one or more simulated images. For example, continuing with the same example, the controller 204 may be configured to determine one or more characteristics of the probable defect (e.g., feature) of the future specimen 220 based on the generated simulated SEM images 408 and/or generated simulated optical images 408.

Characteristics of the specimen 220 and/or features of the specimen 220 which may be determined based on the simulated images 408 may include any characteristic of a specimen known in the art including, but not limited to, a location of a defect within the specimen 220, a type of defect within the specimen 220, a material of the specimen 220, and a topography measurement of a surface and/or pattern of the specimen 220, and the like.

Figure 8:
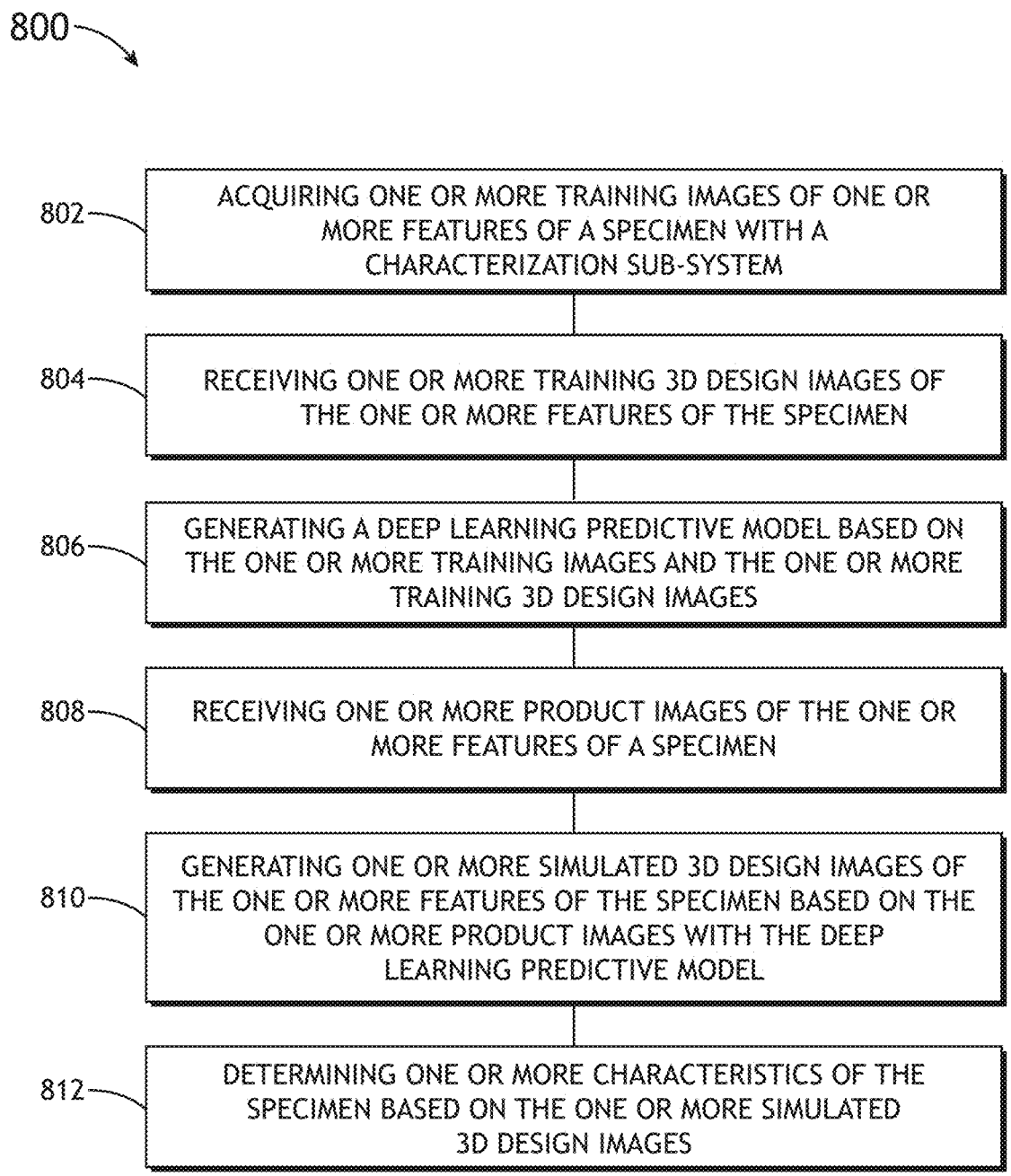
FIG. 8 illustrates a flowchart of a method for generating simulated three-dimensional design images based on scanning electron microscopy (SEM) images utilizing a deep learning predictive model, in accordance with one or more embodiments of the present disclosure.

FIG. 8 illustrates a flowchart of a method 700 for generating simulated images 408 based on three-dimensional design images 406 utilizing a deep learning predictive model 402, in accordance with one or more embodiments of the present disclosure. It is noted herein that the steps of method 700 may be implemented all or in part by system 200. It is further recognized, however, that the method 700 is not limited to the system 200 in that additional or alternative system-level embodiments may carry out all or part of the steps of method 700.

In a step 802, one or more training images of one or more features of a specimen are acquired with a characterization sub-system. For example, as shown in FIG. 3A, the controller 204 may be configured to receive one or more optical training images 225 of one or more features of the specimen 220 from the optical characterization sub-system 202a. By way of another example, as shown in FIG. 3B, the controller 204 may be configured to receive one or more SEM training images 225 of the one or more features of the specimen 220 from the SEM characterization sub-system 202b.

In a step 804, one or more training three-dimensional (3D) design images of the one or more features of the specimen are received. For example, the one or more training 3D design images 404 may be stored in memory 208 such that the controller 204 is configured to receive and/or retrieve the one or more training 3D design images 404 from memory 208.

In a step 806, a deep learning predictive model is generated based on the one or more training images and the one or more training 3D design images. For example, the one or more training images 225 and the one or more training 3D design images 404 may be used as inputs to train the deep learning predictive model 402. The deep learning predictive model 402 may include any type of machine learning algorithm/classifier and/or deep learning technique or classifier known in the art including, but not limited to, a conditional generative adversarial network (CGAN), a convolutional neural network (CNN) (e.g., GoogleNet, AlexNet, and the like), an ensemble learning classifier, a random forest classifier, artificial neural network (ANN), and the like.

In a step 808, one or more product images of one or more features of a specimen are received. For example, as shown in FIG. 3A, the controller 204 may be configured to receive one or more optical product images 235 of one or more features of the specimen 220 from the optical characterization sub-system 202a. By way of another example, as shown in FIG. 3B, the controller 204 may be configured to receive one or more SEM product images 235 of the one or more features of the specimen 220 from the SEM characterization sub-system 202b.

In a step 810, one or more simulated 3D design images of the one or more features of the specimen are generated based on the one or more product images with the deep learning predictive model. For example, the controller 204 may be configured to receive the one or more product images 235 of a probable defect, and generate one or more simulated 3D design images 410 of the probable defect (e.g., feature) with the deep learning predictive model 402.

In a step 812, one or more characteristics of the specimen are determined based on the one or more simulated 3D design images. For example, continuing with the same example, the controller 204 may be configured to determine one or more characteristics of the probable defect (e.g., feature) of the future specimen 220 based on the generated simulated SEM images 408 and/or generated simulated optical images 408. Characteristics of the specimen 220 and/or features of the specimen 220 which may be determined based on the simulated images 408 may include any characteristic of a specimen known in the art including, but not limited to, a location of a defect within the specimen 220, a type of defect within the specimen 220, a material of the specimen 220, and a topography measurement of a surface and/or pattern of the specimen 220, and the like.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The previous description is presented to enable one of ordinary skill in the art to make and use the invention as provided in the context of a particular application and its requirements. As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory.

It is further contemplated that each of the embodiments of the method described above may include any other step(s) of any other method(s) described herein. In addition, each of the embodiments of the method described above may be performed by any of the systems described herein.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A system for characterizing a specimen, comprising:
   a characterization sub-system configured to acquire one or more images a specimen; and
   a controller communicatively coupled to the characterization sub-system, the controller including one or more processors configured to execute a set of program instructions stored in memory, the set of program instructions configured to cause the one or more processors to:
      receive one or more training images of one or more features of a specimen from the characterization sub-system, wherein the specimen comprises a semiconductor wafer;
      receive one or more training three-dimensional (3D) design images corresponding to the one or more features of the specimen;
      generate a deep learning predictive model based on the one or more training images and the one or more training 3D design images;
      receive one or more product 3D design images of one or more features of a specimen;
      generate at least one of one or more simulated scanning electron microscopy images or one or more optical images of the one or more features of the specimen based on the one or more product 3D design images with the deep learning predictive model; and
      determine one or more material characteristics of the specimen based on the at least one of one or more simulated scanning electron microscopy images or one or more simulated optical images.

2. The system of claim 1, wherein the one or more training images of the one or more features of the specimen comprise an optical image of the specimen.

3. The system of claim 1, wherein the one or more training images of the one or more features of the specimen comprise a scanning electron microscopy (SEM) image of the specimen.

4. The system of claim 1, wherein the deep learning predictive model comprises a conditional generative adversarial network (CGAN).

5. The system of claim 4, wherein the one or more processors are further configured to:
   generate one or more simulated training images based on the one or more training 3D design images with a generator of the CGAN; and
   train a discriminator of the CGAN based on the based on the one or more training images, the one or more training 3D design images, and the one or more simulated training images.

6. The system of claim 5, wherein the one or more processors are further configured to train the generator of the CGAN based on one or more discriminator outputs of the discriminator.

7. The system of claim 5, wherein generating the one or more simulated scanning electron microscopy images or the one or more optical images of the one or more features of the specimen based on the one or more product three-dimensional design images with the deep learning predictive model comprises:
   generating the one or more simulated scanning electron microscopy images or the one or more optical images of the one or more features of the specimen based on the one or more product 3D design images with the generator model of the CGAN.

8. The system of claim 1, wherein the one or more characteristics of the specimen further comprise a topography measurement of a surface of the specimen and at least one of a location of a defect within the specimen or a type of defect within the specimen.

9. The system of claim 1, wherein the one or more processors are further configured to:
adaptively modify one or more characteristics of the one or more product 3D design images of the specimen to generate one or more modified product 3D design images.

10. The system of claim 9, further comprising one or more fabrication tools communicatively coupled to the controller, wherein the one or more processors of the controller are further configured to:
generate one or more control signals configured to cause the one or more fabrication tools to fabricate a product specimen based on the one or more modified product 3D design images.

11. The system of claim 1, wherein the one or more processors are further configured to:
perform one or more Monte Carlo simulations on the one or more product 3D design images corresponding to the one or more features of the specimen to generate one or more comparative images; and
determine an accuracy metric of the deep leaning predictive model by comparing the one or more simulated images generated by the deep learning predictive model and the one or more comparative images.

12. A system for characterizing a specimen, comprising:
a controller including one or more processors configured to execute a set of program instructions stored in memory, the set of program instructions configured to cause the one or more processors to:
receive one or more training images of one or more features of a specimen, wherein the specimen comprises a semiconductor wafer;
receive one or more training three-dimensional (3D) design images corresponding to the one or more features of the specimen;
generate a deep learning predictive model based at least on the one or more training images and the one or more training 3D design images;
receive one or more product 3D design images of one or more features of a specimen;
generate at least one of one or more simulated scanning electron microscopy images or one or more optical images of the one or more features of the specimen based on the one or more product 3D design images with the deep learning predictive model; and
determine one or more material characteristics of the specimen based on the at least one of one or more simulated scanning electron microscopy images or one or more simulated optical images.

13. The system of claim 12, wherein the one or more training images are received from a characterization sub-system configured to acquire one or more images of a specimen.

14. The system of claim 12, wherein the one or more processors are further configured to:
adaptively modify one or more characteristics of the one or more product 3D design images of the specimen to generate one or more modified product 3D design images.

15. The system of claim 14, further comprising one or more fabrication tools communicatively coupled to the controller, wherein the one or more processors of the controller are further configured to:
generate one or more control signals configured to cause the one or more fabrication tools to fabricate a product specimen based on the one or more modified product 3D design images.

16. The system of claim 12, wherein the deep learning predictive model comprises a conditional generative adversarial network (CGAN).

17. A system for characterizing a specimen, comprising:
a characterization sub-system configured to acquire one or more images of a specimen, wherein the specimen comprises a semiconductor wafer; and
a controller communicatively coupled to the characterization sub-system, the controller including one or more processors configured to execute a set of program instructions stored in memory, the set of program instructions configured to cause the one or more processors to:
receive one or more training images of one or more features of a specimen from the characterization sub-system;
receive one or more training three-dimensional (3D) design images corresponding to the one or more features of the specimen;
generate a deep learning predictive model based on the one or more training images and the one or more training 3D design images;
receive one or more product images of one or more features of a specimen, wherein the one or more product images comprise at least one of one or more scanning electron microscopy images or one or more optical images;
generate one or more simulated 3D design images of the one or more features of the specimen based on the one or more product images with the deep learning predictive model; and
determine one or more material characteristics of the specimen based on the one or more simulated 3D design images.

18. A system for characterizing a specimen, comprising:
a controller including one or more processors configured to execute a set of program instructions stored in memory, the set of program instructions configured to cause the one or more processors to:
receive one or more training images of one or more features of a specimen, wherein the specimen comprises a semiconductor wafer;
receive one or more training 3D design images corresponding to the one or more features of the specimen;
generate a deep learning predictive model based at least on the one or more training images and the one or more training 3D design images;
receive one or more product images of one or more features of a specimen, wherein the one or more product images comprise at least one of one or more scanning electron microscopy images or one or more optical images;
generate one or more simulated 3D design images of the one or more features of the specimen based on the one or more product images with the deep learning predictive model; and
determine one or more material characteristics of the specimen based on the one or more simulated 3D design images, wherein the one or more characteristics of the specimen comprise a material characteristic of the specimen.

19. A method for characterizing a specimen, comprising:
acquiring one or more training images of one or more features of a specimen with a characterization subsystem, wherein the specimen comprises a semiconductor wafer;
receiving one or more training three-dimensional (3D) design images of the one or more features of the specimen;
generating a deep learning predictive model based on the one or more training images and the one or more training 3D design images;
receiving one or more product 3D design images of one or more features of a specimen;
generating at least one of one or more simulated scanning electron microscopy images or one or more optical images of the one or more features of the specimen based on the one or more product 3D design images with the deep learning predictive model; and
determining one or more material characteristics of the specimen based on the at least one of one or more simulated scanning electron microscopy images or one or more simulated optical images.

20. A method for characterizing a specimen, comprising:
acquiring one or more training images of one or more features of a specimen with a characterization subsystem, wherein the specimen comprises a semiconductor wafer;
receiving one or more training three-dimensional (3D) design images of the one or more features of the specimen;
generating a deep learning predictive model based on the one or more training images and the one or more training 3D design images;
receiving one or more product images of the one or more features of a specimen, wherein the one or more product images comprise at least one of one or more scanning electron microscopy images or one or more optical images;
generating one or more simulated design images of the one or more features of the specimen based on the one or more product images with the deep learning predictive model; and
determining one or more characteristics of the specimen based on the one or more simulated design images, wherein the one or more characteristics of the specimen comprise a material characteristic of the specimen.

* * * * *